Oct. 31, 1961 A. J. FLETCHER ET AL 3,007,146

MAGNETIC HEAD LOCKING DEVICE FOR A MAGNETIC DRUM

Filed Jan. 15, 1957 2 Sheets-Sheet 1

INVENTORS:
Arthur J. Fletcher
Edward Dillingham

By Morris Spector

Their Attorney

INVENTORS:
Arthur J. Fletcher
Edward Dillingham
By Morris Spector
Their Attorney United States Patent Office 3,007,146
Patented Oct. 31, 1961

3,007,146
MAGNETIC HEAD LOCKING DEVICE FOR A MAGNETIC DRUM

Arthur J. Fletcher, Torrance, and Edward Dillingham, Los Angeles, Calif., assignors, by mesne assignments, to Thompson Ramo Wooldridge Inc., Cleveland, Ohio, a corporation of Ohio Filed Jan. 15, 1957, Ser. No. 634,372
3 Claims. (Cl. 340—174.1)

The present invention relates to a head locking device for a magnetic drum and, more particularly, to a device for securely locking a magnetic reading or recording head into a desired position with respect to the surface of a rotatable magnetic drum.

Magnetic drum memory units are widely used in digital computation and control systems. A typical magnetic drum memory unit includes a rotatable drum having a magnetizable surface, and a housing upon which a plurality of magnetic reading or recording heads are mounted within respective openings adjacent to the drum surface. The drum surface is arranged to provide a number of separate information channels and there are one or more magnetic heads associated with each of such channels.

According to one type of mounting, the magnetic heads operate in sliding contact with the moving surface of the drum, requiring that the contact pressure be very closely regulated. According to another type of mounting, the magnetic heads are mounted with a finite spacing from the drum surface, for example, one-thousandth of an inch. It is then necessary to maintain the spacing so that it does not vary from its desired value by more than one ten-thousandths of an inch. Thus, according to either of the conventional methods of mounting the magnetic heads, it is necessary that the heads be very carefully positioned with respect to the drum, and that the desired position be securely maintained within close tolerances.

The problem of mounting magnetic heads on a magnetic drum memory unit is complicated by many factors, including shock and vibration to which the unit may be subjected, substantial variations in operating temperatures, and the fact that magnetic drum memory units are typically operated at high rotational velocities providing a surface velocity of the order of 1,000 inches per second. Furthermore, the typical magnetic drum memory unit includes a large number of magnetic heads and other components and therefore requires a very high degree of reliability of each individual component in order to provide an adequate standard of reliability for the over-all system.

In the prior art there have been numerous devices used for the purpose of establishing and maintaining the positions of the magnetic heads in a magnetic drum memory unit. All of these devices have been unsatisfactory for one reason or another, as will be briefly outlined.

In most of the prior art devices, the locking action of the locking mechanism has tended to disturb the position of the magnetic head. For example, a magnetic head may be correctly placed in its desired position but thereafter the action of locking mechanism in attempting to lock the head in that desired position will introduce a finite displacement of the head. With devices of this type, it is a very difficult and time consuming task to lock the magnetic heads in their desired positions.

Another difficulty with the head locking devices of the prior art is that shock or vibration occurring during the operation of the magnetic drum unit causes the magnetic heads to drift away from the positions in which they were initially locked. Periodic shutdowns of the equipment are therefore necessary in order to realign the magnetic heads in their desired positions.

A further shortcoming of prior art locking devices is that many of them have been constructed as an integral part of the associated magnetic head. The actual use of the magnetic head has frequently resulted in substantial wear of the delicate locking device, which then requires replacement of both the locking device and the magnetic head since they are a single unit.

Finally, the prior art locking devices which have provided satisfactory operation have, nevertheless, been exorbitantly expensive. At the present time approximately half the total cost of a completed magnetic drum memory unit is attributable to the labor cost of positioning the magnetic heads. It is obvious that an improved head positioning and locking arrangement which could reduce this labor cost would be highly desirable and useful.

It is, therefore, an object of the present invention to provide an improved device for locking a magnetic head into position in a magnetic drum memory unit.

Another object of the present invention is to provide a simple and reliable device for securely locking the magnetic head into a desired position in a magnetic drum unit.

Still another object of the invention is to provide a magnetic head locking device which will lock a magnetic head into position in a magnetic drum unit without appreciably disturbing the initial position of the head during locking, and which will thereafter securely maintain the locked position of the head despite shock and vibration.

In accordance with the present invention each opening in the housing surrounding the magnetic drum is provided with an associated flat-bottomed recess, adjacent to the opening and contiguous therewith. Within each recess a locking bar having an end surface facing toward the associated opening is positioned on the bottom of the recess and is slidable toward the opening. A locking screw engaging a tapped hole in the bottom of the recess has a head with a tapered under surface engaging the locking bar, and is adapted to force a sidewise movement of the locking bar so as to clamp into position a magnetic head that has been placed within the opening.

The features of this invention which are believed to be novel and patentable are pointed out in the claims which form a part of this specification. For a better understanding of the invention, reference is now made to the accompanying drawings, in which:

Figure 1:
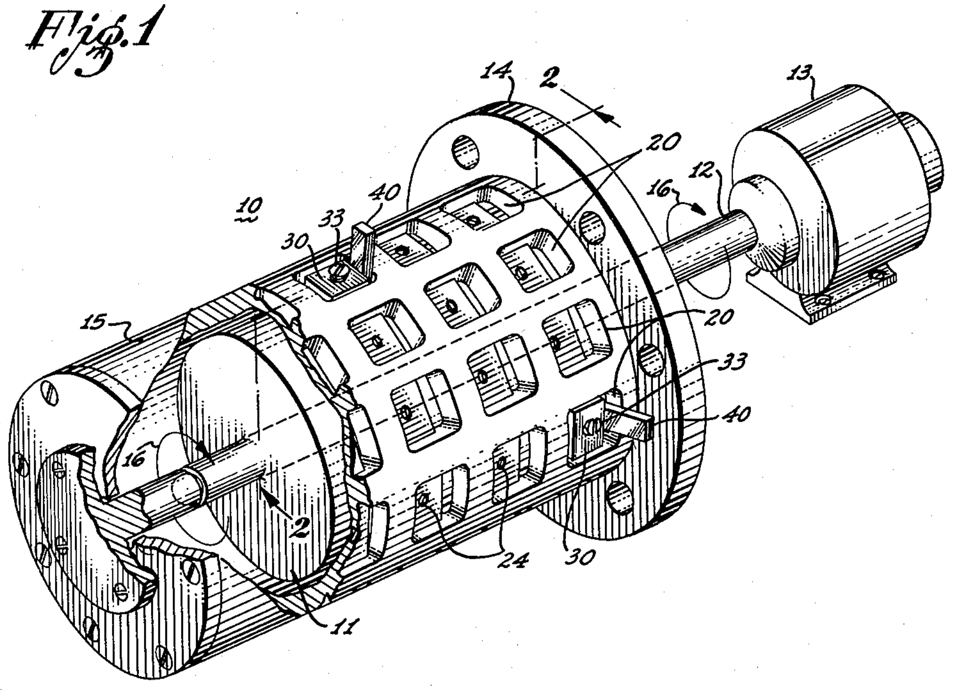
FIGURE 1 is a partially cutaway view of a magnetic drum assembly illustrating magnetic head locking devices in accordance with the present invention.

Referring now more particularly to FIGURE 1, there is illustrated a drum assembly 10 including a magnetic drum 11 fastened to a shaft 12 which is in turn driven by a motor 13. A mounting bracket 14 provides structural support for the assembly, and an external housing 15 which is fastened to the mounting bracket provides a pivotal support for shaft 12. Housing 15 is spaced at least a predetermined distance from the drum surface. Rotation of the shaft 12, and consequently, of the drum 11 is indicated by arrows 16. A plurality of head mounting slots 20 are located in various positions in the housing 15. Two of the head mounting slots 20 contain magnetic heads locked into position by head locking devices as provided by the present invention.

Figure 2:
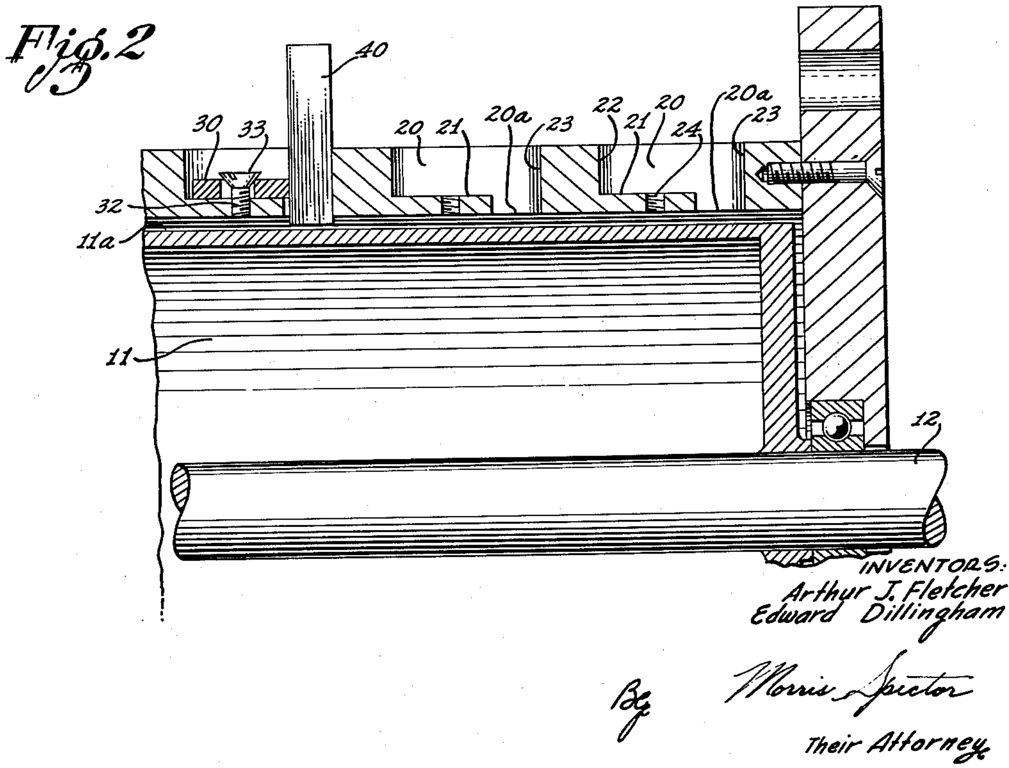
FIGURE 2 is a cross-section of a portion of the magnetic drum taken along line 2—2 of FIGURE 1, including one of the head locking devices of the present invention.

Reference is now made to FIGURE 2, illustrating in detail one of the head locking devices of FIGURE 1 and how it is arranged in the associated head mounting slot. Each head mounting slot 20 has an aperture 20*a* which opens directly upon an outer surface 11*a* of drum 11. Each head mounting slot further includes a recessed portion providing a mounting plate 21 having a top mounting surface parallel to the adjacent portion of the drum surface, and a left hand wall 22 adjoining the mounting surface. On the right hand side of aperture 20*a*, a wall 23 is perpendicular to the drum surface and extends through the entire thickness of housing 15, well above mounting plate 21. Mounting plate 21 includes a tapped hole 24 which is centrally located therein. A magnetic head 40 which is to be positioned with respect to the drum surface is passed through aperture 20*a* and aligned flush against the right hand wall 23 of the head mounting slot. A locking bar 30 rests upon the mounting surface of plate 21 and has a locking bar hole 31 therein (as will be clearly seen in FIGURE 3) which is eccentrically located with respect to tapped hole 24 in the direction away from aperture 20*a*. A locking screw 32 having a tapered head 33 engages tapped hole 24 and (in the locked position) exerts a continuing sidewise thrust on locking bar 30, thereby clamping the magnetic head 40 against the right hand side wall of the mounting slot.

Figure 3:
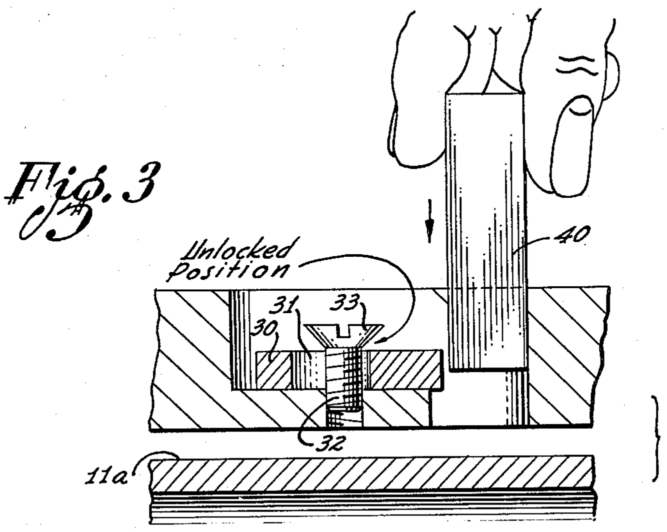
FIGURE 3 is a cross-section view illustrating the unlocked position of the head locking device of FIGURE 2.
Figure 4:
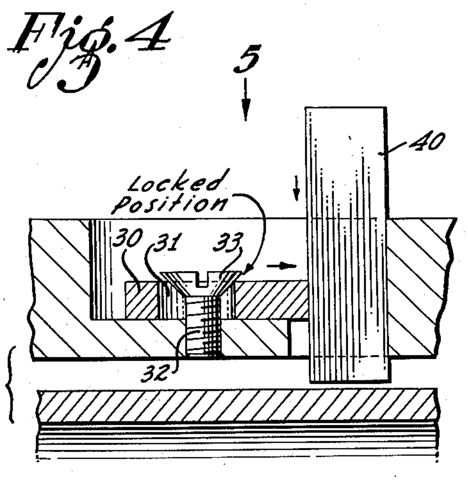
FIGURE 4 is a cross-section view illustrating the locked position of the head locking device of FIGURE 2.
Figure 5:
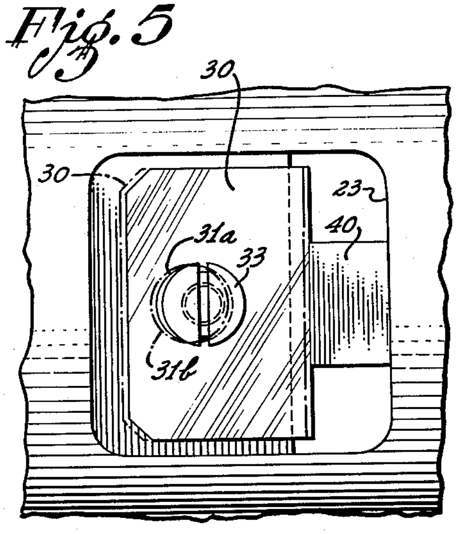
FIGURE 5 is a plan view of the top of the head locking device of FIGURE 2 illustrating both the locked and the unlocked positions.

The locked position of the magnetic head referred to in the previous paragraph is illustrated in FIGURES 2, 4 and 5, while FIGURE 3 shows the manner of inserting a magnetic head into slot 20 when the locking device is unlocked. Although not specifically illustrated, it will be understood that in the absence of a magnetic head occupying the right hand portion of the mounting slot, locking screw 32 may be tightened to an extent such as to cause locking bar hole 31 to become concentric therewith. Locking bar 30 would then extend so far toward right hand side wall 23 that there would be insufficient spaced to insert a magnetic head. In other words, when the magnetic head and locking bar are in the locked position, the locking screw continues to exert a sidewise thrust upon locking bar 30 because it is eccentrically located with respect to locking bar hole 31. On the other hand, when the locking device is in its unlocked position so that the magnetic head may be either inserted or removed, the locking bar is further to the left and locking bar hole 31 is even more eccentrically located with respect to the locking screw.

In FIGURE 2, three of the mounting slots 20 are illustrated in cross-section with the left hand slot containing a locking bar 30, a locking screw 32, and a magnetic head 40 in the locked position. The magnetic head is shown as being spaced a finite distance from surface 11*a* of magnetic drum 11. The other two mounting slots of FIGURE 2 are illustrated as having no magnetic head or locking device mounted therein. FIGURES 4 and 5 show the magnetic head and locking device of the left hand portion of FIGURE 2 to a larger scale, FIGURE 4 being a cross-section view similar to FIGURE 2, while FIGURE 5 is a top or plan view.

FIGURE 3 illustrates the unlocked position of the locking device when a magnetic head is occupying the mounting slot. From this view it will be noted that locking bar hole 31 must be large enough to permit considerable sidewise movement of the locking bar, and particularly must permit the withdrawal of the locking bar from side wall 23 sufficiently to enable a magnetic head to be inserted or removed. The unlocked position indicated in FIGURE 3 is also illustrated in FIGURE 5 where dotted lines show the left hand or unlocked position of the locking bar. In FIGURE 5 the screw head is designated by the reference numeral 33, the location of locking bar hole 31 in the locked position is designated as 31*a*, and the location of the locking bar hole in the unlocked position as 31*b*. Screw head 33 is sufficiently larger than locking bar hole 31 so that the locking bar is safely retained in position at all times.

The locking action of the locking device provided by the present invention has no tendency whatsoever to disturb the position of the magnetic head. As locking screw 32 is tightened into the locked position, the tapered undersurface of the screw head engages the upper right hand surface (FIGURE 3) of locking bar hole 31 and exerts a force upon locking bar 30 which is both downward and to the right. Both the upper surface of mounting plate 21 and the lower surface of locking bar 30 are preferably smooth machined surfaces so that locking bar 30 moves in a direction exactly parallel to the drum surface and exactly perpendicular to right side wall 23 and to magnetic head 40. When locking bar 30 engages magnetic head 40, therefore, there is no component of force which tends to disturb the position of the magnetic head in the vertical direction.

The dimensions of mounting slot 20 are such as to permit the position of magnetic head 40 to be conveniently and easily adjusted. Magnetic head 40 may be moved up or down so that it is spaced a desired amount from the magnetizable drum surface. It may also be moved in the direction of rotation of the drum so as to provide a desired circumferential position with respect to the associated information channel on the drum. The only requirement is that one surface of magnetic head 40 must be maintained flush against the surface of right side wall 23. These two surfaces are preferably smooth.

The positioning and locking arrangement illustrated herein provides a very secure mounting for the magnetic head. Magnetic head 40 and right side wall 23 are maintained in contact with each other over a relatively large area covering the full width of the magnetic head and a large portion of the length of the head so that any torque or turning motion is reliably precluded. Locking bar 30 is a relatively thick piece which firmly engages one side of the magnetic head. Furthermore, the mounting plate 21 preferably has such a depth that locking bar 30 is approximately opposite the vertical center of right side wall 23.

When the locking device is securely tightened into the locked position, the upper portion of locking screw 32 which projects above bottom plate 21 is deflected slightly to the left away from magnetic head 40. It therefore, to extent, acts as a spring clamp for holding locking bar 30 in position. For this reason locking screw 32 is preferably made of high grade steel.

A significant result of the spring clamping action of locking screw 32 is evidenced by the ability of the locking device to withstand shock and vibration. Shock or vibration has little tendency to damage or deform any of the parts, but merely causes the leftward deflection of the upper portion of the locking screw 32 to be either greater or less than its normal value. Since the locking screw made of a resilient material, it resumes its normal position after the shock or vibration has ceased.

Figures 6, 7:
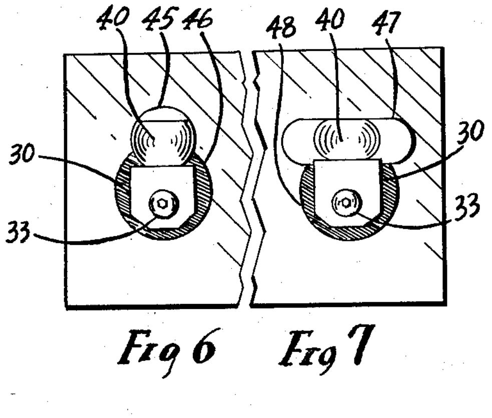
FIGURES 6 and 7 illustrate two other forms of the head locking device of the present invention.

Reference is now made to FIGURES 6 and 7 which are top views of two other forms of the head locking device of the present invention. The particular advantage of the embodiments of FIGURES 6 and 7 is their much greater ease of fabrication. The opening and recesses in the housing structure are generally circular and may be formed by drilling, hence do not require milling as do the rectangular openings shown in FIGURES 1 to 5.

Thus in FIGURE 6 the opening through the housing is a circular hole 45 which is overlapped to a substantial degree by a larger hole 46 which provides the associated recess. The opening and the recess together form substantially a figure 8. Magnetic head 40 has a substantially cylindrical shape so as to fit into the opening, the outer diameter of the head being only slightly less than the inner diameter of the opening so as to permit a relatively tight engagement. A flat surface is provided on that side of the magnetic head which is to be engaged by the locking bar. In the embodiment of FIGURE 6, the magnetic head is adjustable up and down relative to the drum surface.

In the embodiment of FIGURE 7 the opening 47 in the housing is formed by drilling a pair of spaced holes, and thereafter milling out the portion of the housing structure between the two holes so as to form a flattened ellipse. The associated recess 48 is again circular in form and overlaps the opening to a substantial degree to permit adequate working space for the locking bar to engage a magnetic head occupying the opening. In FIGURE 7 the magnetic head has two flattened surfaces, one for engaging the flat wall of the opening opposite the locking bar, and the other for engagement by the associated locking bar. In this embodiment the magnetic head is adjustable up and down relative to the drum surface as well as in respect to its circumferential position on the drum.

It is convenient to use the embodiments of FIGURES 6 and 7 in the same magnetic drum assembly, the embodiment of FIGURE 6 being employed where only an up and down adjustment is required, and the embodiment of FIGURE 7 being employed where the circumferential position of the magnetic head must also be adjustable. It then becomes convenient to use a uniform type of magnetic head which is cylindrical with two flattened surfaces on opposite sides, and which fits either the embodiment of FIGURE 6 or the embodiment of FIGURE 7.

It has therefore been shown that the present invention provides a new and improved arrangement for positioning and locking magnetic heads in a magnetic drum memory unit. The present invention provides a novel locking device which has the advantages of ease of fabrication, simplicity of operation, and reliability. Furthermore, the locking device is made separate from the magnetic head so that replacement of one does not require replacement of the other. An additional advantage is that the magnetic head may be placed in a desired position and quickly locked there, the locking action having no tendency to disturb the head from its desired position. A still further advantage of the locking device is that the spring clamping action of the locking screw precludes any injurious consequences of shock or vibration.

While the novel locking device provided by the present invention has been illustrated in certain particular forms, it will be readily appreciated that many other forms may be used which are equivalent and which fall within the scope of the invention.

What we claim as new and desire to secure by Letters Patent of the United States is:

1. A magnetic drum assembly comprising: a housing spaced a finite distance from the magnetic surface of a drum and including at least one opening therein in communication with said drum surface and extending substantially perpendicular thereto, a bearing surface in said opening; a magnetic head disposed in said opening engaged with and freely slidable along said bearing surface; a locking bar movably supported on said housing adjacent to said opening and movable toward and away from said opening; a resilient locking screw engaging said housing and having a head with a tapered undersurface engaging said locking bar for forcing said locking bar toward said opening and against said magnetic head such that the reaction force on said locking bar causes said screw to bend perpendicularly to its axis and in the direction away from the magnetic head to thereby provide continuous spring pressure against said locking bar.

2. In combination with a magnetic drum, a housing spaced a finite distance from the drum and defining at least one opening therein extending in a direction substantially perpendicular to the surface of said drum; a bearing surface in said opening; a magnetic head disposed in said opening engaged with and freely slidable along said bearing surface in a direction toward and away from said drum surface; a locking bar having an aperture therein; means attaching said locking bar to said housing adjacent to said opening restricting movement of said bar to a direction parallel to the axis of said drum; said means comprising a resilient locking screw extending through said aperture and threadedly engaging said housing, said locking screw having a head with a tapered undersurface engaging said locking bar for forcing said locking bar toward said opening and against said magnetic head for locking said magnetic head a finite distance from said drum surface between said locking bar and said bearing surface such that the reaction force on said locking bar causes said screw to bend perpendicularly to its axis and in the direction away from the magnetic head to thereby provide continuous spring pressure against said locking bar.

3. A magnetic drum assembly comprising: a housing enclosing a substantial portion of the magnetic surface of a drum and including at least one opening therein and in communication with the surface of said drum, said opening being adapted to receive a magnetic head; a flat-bottomed recess in said housing adjacent to and contiguous with said opening; a tapped hole in the bottom of said recess; a locking bar slideably affixed to the bottom of said recess and having a hole therein alignable with said tapped hole, one end of said locking bar facing toward said opening and being adapted to engage a magnetic head disposed therein; and a locking screw passing through the hole in said locking bar and threadedly engaging said tapped hole, said locking screw having a head with a tapered undersurface for forcing said locking bar toward a position such that the hole therein is concentrically aligned with said tapped hole and so maintained by spring tension in said screw, the width of said opening being such that when a magnetic head is inserted therein and said locking screw is tightened said one end of said locking bar locks the magnetic head into position while the hole in said locking bar is still eccentrically aligned with said tapped hole.

References Cited in the file of this patent

UNITED STATES PATENTS

| | | |
|---|---|---|
| 1,348,279 | Heywood | Aug. 3, 1920 |
| 2,096,472 | Schmidt | Oct. 19, 1937 |
| 2,632,536 | Skeel | Mar. 24, 1953 |
| 2,700,588 | Williams et al. | Jan. 25, 1955 |
| 2,708,693 | Hendrickson | May 17, 1955 |
| 2,713,386 | Holtz | July 19, 1955 |
| 2,790,966 | Malbon et al. | Apr. 30, 1957 |
| 2,862,067 | Christoff | Nov. 25, 1958 |
| 2,864,892 | Perkins | Dec. 16, 1958 |
| 2,900,625 | Jones et al. | Aug. 18, 1959 |

FOREIGN PATENTS

| | | |
|---|---|---|
| 730,339 | Great Britain | May 18, 1955 |
| 801,982 | Great Britain | Sept. 24, 1958 |